Feb. 7, 1961  G. McCANN, JR  2,970,864
AUXILIARY SUN VISOR FOR MOTOR VEHICLES
Filed July 16, 1959

INVENTOR.
GENE McCANN, JR
BY Alexander Riaboff
ATTORNEY

United States Patent Office 2,970,864
Patented Feb. 7, 1961

2,970,864

AUXILIARY SUN VISOR FOR MOTOR VEHICLES

Gene McCann, Jr., 329 S. Ashton Ave., Millbrae, Calif.

Filed July 16, 1959, Ser. No. 827,626

4 Claims. (Cl. 296—97)

This invention relates to an auxiliary sun visor for motor vehicles.

Usually an automobile is provided with a pair of sun visors secured inside thereof above the windshield, and so arranged that they may be turned downwardly to shield the eyes of a driver from the sun glare. But there is always a space left between said visors in the middle of said windshield which remains unshielded, and through which the sun may glare in the driver's eyes if the sun is low and the automobile is driven in a certain direction.

It is the purpose of this invention to provide a simple and inexpensive auxiliary sun visor, which can be carried by one of the standard visors without any special means of attachment, and which can be extended to occupy the space between said visors to cut off the sun glare therebetween.

Another object of this invention is to provide an auxiliary sun visor of the type described which can be easily slipped on an automobile visor and securely carried thereby, said auxiliary sun visor having a slidable shield therein, which shield may be slid outwardly into the gap between the automobile visors.

Another object of this invention is to provide an auxiliary sun visor of the type described which may also be used for checking gasoline consumption.

Another object of the invention is to provide said auxiliary visor with means for quick and accurate calculation of the gasoline mileage.

Other objects and advantages will appear as the specification proceeds and the novel features of the device will be particularly pointed out in the claims hereto annexed.

In this specification and the annexed drawing, the invention is illustrated in the form considered to be the best but it is understood that the invention is not limited to such form; and it is also to be understood that in and by the claims following the description, it is desired to cover the invention in whatsoever form it may be embodied.

My invention is illustrated in an accompanying drawing in which.

Figure 1:
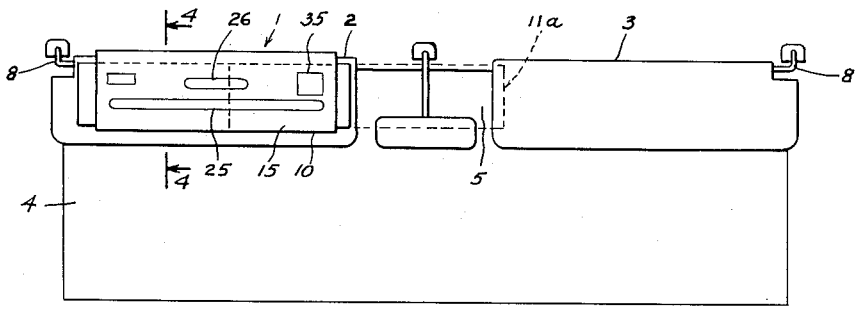
Fig. 1 shows an automobile windshield as seen from the inside of an automobile with two automobile visors and an auxiliary sun visor carried by one of them.
Figure 2:
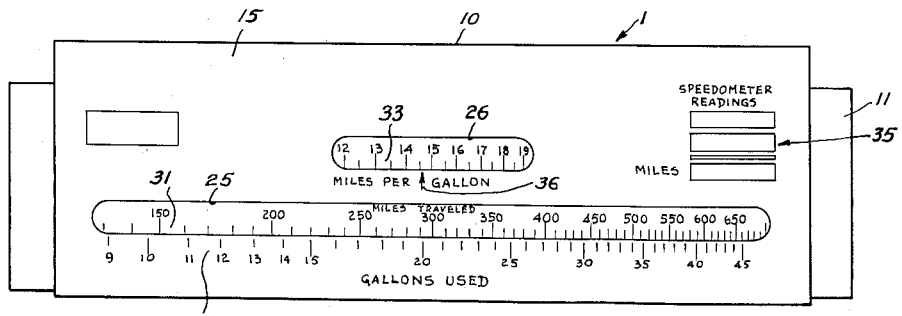
Fig. 2 is an enlarged plan view of the auxiliary sun visor.
Figure 3:
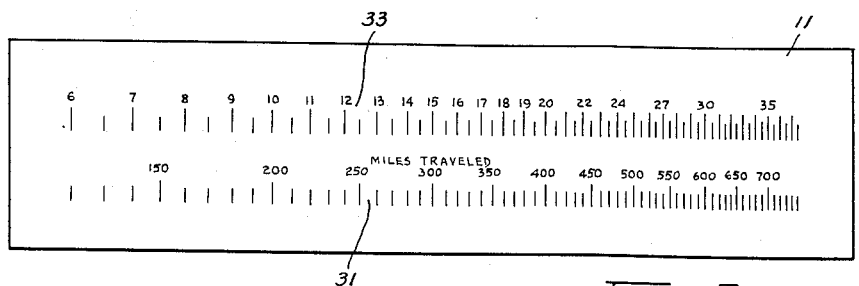
Fig. 3 is an enlarged plan view of the slidable shield carried by said auxiliary sun visor.
Figure 4:
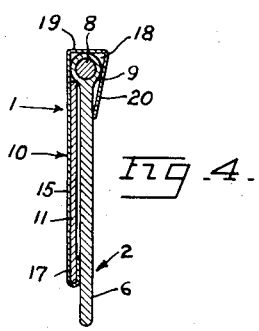
Fig. 4 is a vertical cross-section taken on the line 4—4 of Fig. 1 of the automobile visor and the auxiliary sun visor.

In detail, my auxiliary sun visor 1 is used in connection with standard automobile visors 2 and 3 secured inside of an automobile above the windshield 4 and forming a gap 5 therebetween.

The automobile visors 2 and 3 are made in form of an elongated plate 6 having rounded edges and supported on round metal bars 8 swingably secured to the automobile. The bars 8 are imbedded in the plates 6 as shown at 9.

The auxiliary visor 1 consists of a shell 10 and a shield 11 slidable therein. The shell 10 is preferably made out of opaque plastic material and has a front side 15, the lower edge of which is bent backwardly and upwardly to form a trough 17 extending the length of said front side 15. The upper edge of said front side is formed into a channel 18 having a top 19 extending backwardly at right angle to the front side and a retainer 20 extending downwardly and forwardly from said top.

The shell 10 is placed on the automobile visor 2 so that the top 19 rests on the top of said visor and the retainer 20 presses against the back of said visor, thus pressing the front side 15 against the front side of said visor.

The shield 11 comprises an elongated rectangular flat piece preferably made of an opaque plastic. The shield 11 is preferably longer than the shell 10 and extends beyond the latter as shown in Fig. 1. Said shield is arranged in said shell 10 for sliding in said trough 17 between said front side 15 and the automobile visor 2 with the top of said shield terminating slightly below the bar 8. The shield 11 moves easily sideways and may be moved to the right, looking at Fig. 1, so as to completely close the gap 5 between the automobile visors 2 and 3, as shown in dotted lines at 11a.

The auxiliary visor 1 may also be used as a gasoline consumption mileage calculator.

The shell 10 is formed with an elongated transparent window 25 extending substantially the length thereof, which window is in close vicinity to the lower edge of said shell and is parallel thereto. Another transparent window 26 is formed in the center of said shell 10 and above the window 25. The window 26 is of the same width as the window 25 but is considerably shorter.

The shell 10 is provided with a logarithmic scale 30 arranged below and in close vicinity to said window 25 with numerals thereunder from 9 to 45, denoting the number of gallons consumed by a motor vehicle.

The shield 11 has a logarithmic scale 31 provided thereon and visible through said window 25, the graduations of which are numbered from 150 to 650 denoting the number of miles travelled. The shield 11 has also a logarithmic scale 33 printed thereon so as to be visible through the window 26, the graduations of which are marked with numerals from 6 to 35 and representing gas consumption in miles per gallon.

There is also provided on said shell a space 35 for recording the number of miles shown by the speedometer of a vehicle when the tank is filled up, the number of miles shown by same speedometer when the tank is filled up again, and a space for the difference between the second reading and the first one, which difference represents the number of miles travelled. The number of gallons purchased the second time shows the number of gallons used to travel said distance.

The auxiliary visor 1 is placed on the standard visor 2, as hereinabove described. Whenever the driver of the vehicle desires to cover the gap 5 between the standard visors 2 and 3, he slides the shield 11 out of the shell 10 as far as it is desirable to cover said gap or until it reaches the visor 3.

In order to use said visor 1 as a gasoline consumption mileage calculator, the driver marks the number of miles shown by the speedometer of his vehicle when he fills up the tank and writes said mileage down in the space 35. At the next stop at a gasoline station he writes the new mileage on said space 35 where indicated and then again fills up the tank. The amount of gas purchased will indicate the number of gallons consumed, and the difference between the second mileage and the first indicates the number of miles travelled. In order to calculate the rate of consumption of gasoline, the shield 11 is moved to the left until the number of gallons consumed as shown on the scale 30 coincides with the number of miles travelled, as shown on the scale 31. The indicator 36 below the opening 26 will indicate the number of miles per gallon on the scale 33. For instance: the number of gallons consumed is 25 gallons, and the number of miles travelled is 368. Then the number of miles travelled per gallon is 14.7, as indicated by the indicator 36.

Figure 5:
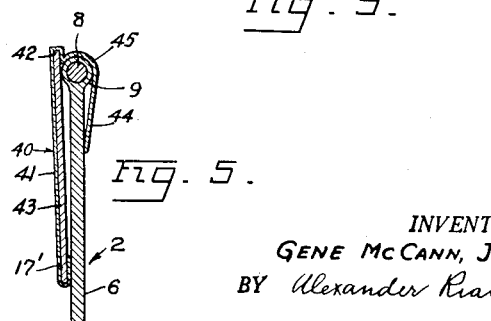
Fig. 5 is a vertical cross-section similar to one shown in Fig. 4, but showing a modified auxiliary sun visor.

Fig. 5 shows a modified form of shell 40 having a front side 41 with a trough 17' formed at the bottom thereof. The upper part of the front is provided with a groove 42 in which the upper edge of the shield 43 slides. A retainer 44 having a rounded portion 45 resting on the upper edge of the vehicle visor 2, extends downwardly and forwardly from said groove. The retainer 43 presses the shell 40 against the visor 2. The trough 17' and the groove 42 provide positive guides for sliding of the shield 43.

I claim:
1. An auxiliary sun visor for attachment to a visor of a motor vehicle, said auxiliary visor comprising a shell and a shield, said shell being made of a sheet of rigid material and having its lower edge bent backwardly and upwardly to form a trough, and having its top bent backwardly, downwardly and forwardly for embracing the top of the vehicle's visor and for resiliently pressing the shell against the latter visor; said shield being made out of rigid flat opaque material, and slidable in the trough between said shell and the vehicle's visor.

2. An auxiliary visor for attachment to a visor of a motor vehicle, said auxiliary visor comprising a shell made of a flat rigid material and comprising a front having its lower edge bent backwardly and upwardly to form a trough, and its upper edge bent backwardly at a right angle to form a top, and downwardly and forwardly at an angle to said top to form a retainer, which in conjunction with said top forms a channel in which the top of the vehicle's visor is retained and resiliently held therein by said retainer; and a shield slidable in said trough between said front and the motor vehicle's visor.

3. An auxiliary visor for attachment to a motor vehicle's visor supported by a bar passing longitudinally through said vehicle's visor near the top thereof, said auxiliary visor comprising a shell made out of flat rigid material and having a front side with its lower edge bent backwardly and upwardly to form a longitudinal trough extending the length of said shell, said shell having its upper edge bent backwardly at a right angle to the front side to form a top, and downwardly and forwardly to form a resilient retainer, said shell being placed on the vehicle's visor so that the top rests on the upper edge of the latter visor and the retainer abuts the back side of the latter visor resiliently to force the shell against the latter visor; and a shield in form of an elongated opaque flat piece slidable in said trough between said front side and the vehicle's visor and extending from said trough to substantially said bar of the vehicle's visor, said shield being slidable outwardly in said trough.

4. A device as defined in claim 3, wherein the whole length of the upper edge is bent backwardly and downwardly and forwardly to form said resilient retainer.

References Cited in the file of this patent
UNITED STATES PATENTS

| | | |
|---|---|---|
| 2,120,892 | Francis | June 14, 1938 |
| 2,184,360 | Nichols | Dec. 26, 1939 |
| 2,185,898 | Mitchell | Jan. 2, 1940 |
| 2,304,327 | Anderson | Dec. 8, 1942 |
| 2,724,552 | Sherwood | Nov. 22, 1955 |
| 2,818,298 | Goeske | Dec. 31, 1957 |